United States Patent [19]

Bopp et al.

[11] Patent Number: 4,879,346

[45] Date of Patent: Nov. 7, 1989

[54] BLENDS OF A SILICONE-POLYCARBONATE BLOCK COPOLYMER WITH A COMPATIBILIZED ALLOY OF POLYPHENYLENE ETHER RESIN/POLYESTER RESIN

[75] Inventors: Richard C. Bopp, West Coxsackie; John B. Yates, III, Glenmont, both of N.Y.

[73] Assignee: General Electric Company, Selkirk, N.Y.

[21] Appl. No.: 205,264

[22] Filed: Jun. 10, 1988

[51] Int. Cl.$^4$ ............................................... C08F 8/00
[52] U.S. Cl. ...................................... 525/146; 525/133; 525/393; 525/394; 524/135; 524/170; 524/251; 524/217; 524/236; 524/430; 524/464
[58] Field of Search ............... 525/133, 146, 393, 394; 524/430, 464, 236, 217, 251, 135, 170

[56] References Cited

U.S. PATENT DOCUMENTS

| | | | |
|---|---|---|---|
| Re. 32,406 | 4/1987 | Molari, Jr. ........................ | 428/412 |
| 3,189,662 | 6/1965 | Vaughn, Jr. ....................... | 260/824 |
| 3,915,926 | 10/1975 | Wambach ......................... | 252/8.1 |
| 4,013,613 | 3/1977 | Abolins et al. ..................... | 260/40 |
| 4,027,072 | 5/1977 | Molari, Jr. ........................ | 428/412 |
| 4,123,410 | 10/1978 | Lee, Jr. ............................. | 528/212 |
| 4,206,154 | 6/1980 | Lee, Jr. et al. ..................... | 525/132 |
| 4,220,735 | 9/1980 | Dieck et al. ........................ | 525/90 |
| 4,344,878 | 8/1982 | Dolce ................................ | 524/409 |
| 4,672,086 | 6/1987 | Seiler et al. ........................ | 524/127 |

FOREIGN PATENT DOCUMENTS 0133641 3/1985 European Pat. Off. .

*Primary Examiner*—Melvyn I. Marquis
*Attorney, Agent, or Firm*—Hedman, Gibson, Costigan & Hoare

[57] ABSTRACT

Blends of a silicone-polycarbonate block copolymer with a compatibilized alloy of polyphenylene ether and polyester resins comprise a class of thermoplastic materials with physical properties ranging from those of a self-extinguishing, tough thermoplastic elastomer to a rigid engineering material. The compatibilizers include aromatic polycarbonates and rubber-modified impact modifiers.

19 Claims, No Drawings

BLENDS OF A SILICONE-POLYCARBONATE BLOCK COPOLYMER WITH A COMPATIBILIZED ALLOY OF POLYPHENYLENE ETHER RESIN/POLYESTER RESIN

FIELD OF THE INVENTION

The present invention relates to novel compositions comprised of a silicone-polycarbonate copolymer and a polyphenylene ether resin/polyester resin blend. More specifically, the present invention relates to blends of a silicone-polycarbonate block copolymer with an alloy of polyphenylene ether/polyester, wherein the alloy contains a minor amount of one or more compatibilizers which serves to effect or improve compatibility between the polyphenylene ether resin and the polyester resin. The compositions of the present invention comprise a novel class of thermoplastic materials with physical properties ranging from those of a self-extinguishing, tough thermoplastic elastomer to a rigid engineering material.

BACKGROUND OF THE INVENTION

Silicone-polycarbonate copolymers are known in the art as are the copolymers of the preferred embodiments of the present invention, i.e., silicone-polycarbonate block copolymers.

For example, Vaughn et al., U.S. Pat. No. 3,189,662, disclose organopolysiloxane-polycarbonate block copolymers and a method for preparing them. The reference mentions that the described copolymers are useful as surface coatings for appliances, as insulation, as coatings for rods and wires, as binding material for parts and laminates, and in adhesive formulations. The reference does not mention blending such silicone-polycarbonate copolymers with any other thermoplastic or thermoset resin copolymer or blend thereof.

Molari, U.S. Pat. Nos. 4,027,072 and Re. No. 32,406, discloses polycarbonate laminates in which the laminae are bonded by polysiloxane-polycarbonate block copolymers.

It is also known that polyphenylene ether and polyester resins can be blended together along with reinforcements and/or flame retardant additives to produce thermoplastic compositions with various desired properties such as flame retardance and reduced melt viscosity.

For example, Abolins et al., U.S. Pat. No. 4,013,613, disclose thermoplastic compositions which include admixtures of polyphenylene ether and polyester resins. Included within the thermoplastic compositions of the patentees are those wherein the admixtures of resins are in combination with a reinforcing amount of a reinforcing filler. In combination, the three-component thermoplastic compositions included within the invention are those which do not delaminate or separate when cooled, and those which do not manifest a failure to form structurally useful compositions because of reduced gross physical properties, chemical resistance, macroscopic appearance and the like.

Betts et al., EP-A No. 0133641, disclose flame retardant thermoplastic compositions of admixtures of a polyester resin and a flame retardant agent comprised of a combination of a polyphenylene ether resin, an organic phosphate and a stable brominated material.

Lee, U.S. Pat. No. 4,123,410, discloses a thermoplastic composition of an admixture comprised of polyphenylene ether, a plasticizer and an amount of a polyester sufficient to reduce the melt viscosity of said composition without substantially reducing the heat distortion temperature and ductility properties. The preferred amount of polyester is 2–5% by weight.

Also, Lee et al., U.S. Pat. No. 4,206,154, disclose self-extinguishing thermoplastic molding compositions comprising a polyphenylene ether resin, a styrene resin, a halogenated aromatic flame retardant, ferrocene and from 1–15% by weight of a fatty-acid terminated saturated polyester.

Also, in copending commonly-owned application, Ser. No. 891,497 filed July 29, 1986, abandoned, there are disclosed highly compatible polymer blends having a high degree of impact resistance and solvent resistance. These blends comprise at least one polyphenylene ether or blend thereof with at least one polystyrene, at least one poly(alkylene dicarboxylate), at least one elastomeric polyphenylene ether-compatible impact modifier, and at least one polymer containing a substantial proportion of aromatic polycarbonate units.

Illustrative of the linear polyesters are the poly(alkylene dicarboxylates) and especially the poly(alkylene terephthalates). In copending, commonly owned application, Ser. No. 010,867 filed Feb. 4, 1987, there are disclosed similar polymer blends which are highly compatible and have high solvent resistance and favorable tensile properties but which are particularly useful in applications where impact strength is not the primary consideration.

Finally, Seiler et al., U.S. Pat. No. 4,672,086 disclose self-extinguishing thermoplastic polyester molding materials containing a linear aromatic polyester resin, a polyphenylene ether resin, a phosphate-containing compound and a filler. The compositions may optionally contain an aromatic polycarbonate.

The compositions of the present invention are believed to describe a novel class of thermoplastic materials comprised of, preferably, a blend of silicone-polycarbonate block copolymer and a compatibilized polyphenylene ether resin/polyester resin alloy.

SUMMARY OF THE INVENTION

In accordance with the invention, there are provided thermoplastic compositions comprising:
(a) silicone-polycarbonate copolymer; and
(b) an admixture comprised of polyphenylene ether resin, polyester resin and polycarbonate resin.

In preferred embodiments, there are provided thermoplastic compositions comprising:
(a) silicone-polycarbonate block copolymer;
(b) compatibilized polyphenylene ether resin/polyester resin alloy comprising:
  (i) polyphenylene ether resin;
  (ii) polyester resin; and
  (iii) at least one compatibilizer in an amount sufficient to effect or improve compatibilization between components (b)(i) and (b)(ii).

In those embodiments of the present invention where component (a) is present in a major amount, i.e., 50% or greater by weight based upon 100% by weight of (a) and (b) combined, the compositions can provide thermoplastic materials which are tough thermoplastic elastomers and self-extinguishing.

In those embodiments of the present invention where component (b) is present is a major amount, i.e., greater than 50% by weight based upon 100% by weight of (a) and (b) combined, the compositions can provide rigid engineering materials which exhibit a good cross-section of physical properties.

A full range of properties are obtainable through variations in the compositions.

In addition, the inclusion of other property-improving components in property-improving amounts can effect desirable further improvements in the compositions.

DESCRIPTION OF THE INVENTION

In accordance with the present invention, a silicone-polycarbonate copolymer is admixed with a blend of a polyphenylene ether resin and a polyester resin. Suitable silicone-polycarbonate copolymers are known in the art as are polyphenylene ether resin/polyester resin blends.

In accordance with the preferred embodiments of the present invention, a silicone-polycarbonate block copolymer is blended with a compatibilized polyphenylene ether resin/polyester resin alloy.

The preferred silicone-polycarbonate block copolymers ("copolymers") of the present invention, in general, comprise a class of thermoplastic elastomers which exhibit low temperature ductility and are self-extinguishing. Such copolymers can be represented by the average Formula I:

alkyl radicals and halogen radicals and mixtures thereof.

Included within the radicals represented by R of Formula I are aryl radicals and halogenated aryl radicals such as phenyl, chlorophenyl, xylyl, tolyl, etc.; aralkyl radicals such as phenylethyl, benzyl, etc., aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, R' includes all radicals included by R above except hydrogen, where R' can be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc., radicals. Radicals that are included within the definition of Z of Formula I are hydrogen, methyl, ethyl, propyl, chloro, bromo, iodo, etc. and combinations thereof, and Z is preferably hydrogen.

The copolymers useful in the present invention can be further described as comprising recurring copolymeric units of a polydiorganosiloxane joined by substituted aryloxy-silicon linkages to a polyester or dihydric phenol and a precursor of carbonic acid, where each of

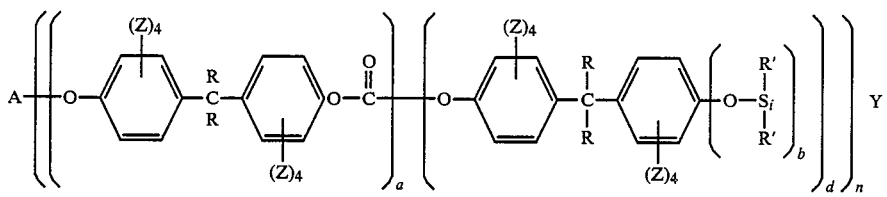

wherein n is at least 1, and preferably n is an integer equal to from 1 to about 1000, inclusive; a is equal to from 1 to about 200, inclusive; and b is from about 1 to 100 and, preferably, has an average value of from about 15 to about 90, inclusive; while the ratio of a to b can vary from about 0.05 to about 3, inclusive, and when b has an average value of from about 15 to about 90 inclusive, the ratio of a to b is preferably from about 0.067 to about 0.45, inclusive; d is 1 or more; Y is

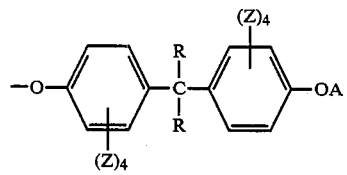

A is a member selected from the class of hydrogen and

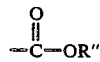

R is a member selected from the class of hydrogen, monovalent hydrocarbon radicals and halogenated monovalent hydrocarbon radicals, R' is a member selected from the class of monovalent hydrocarbon radicals and cyanoalkyl radicals, R" is a member selected from the class consisting of monovalent hydrocarbon radicals and halogenated hydrocarbon radicals, and Z is a member selected from the class of hydrogen, lower said recurring copolymeric units comprises by average weight from about 10 to about 75% of the polydiorganosiloxane, and preferably from about 40 to 70% by weight.

The copolymers of Formula I can be produced by reacting at temperatures in the range of 0° to 100° C., preferably 20° to 50° C., and in the presence of an acid acceptor, a mixture of a halogen chain-stopped polydiorganosiloxan having the Formula II:

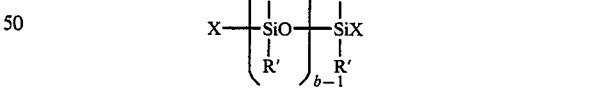

and a dihydric phenol having the Formula III:

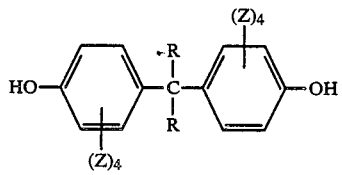

and thereafter phosgenating said reaction product until the resulting copolymer achieves a maximum intrinsic viscosity, where R, R', Z and b are as defined above, and X is a halogen radical, preferably chloro. The halogen chain-stopped polydiorganosiloxanes of Formula II can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diogganodichlorosilane and a cyclic polydiorganosiloxane in the presence of a metal cataylst such as ferric chloride as shown in Sauer U.S Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably in the range of from about 1 to about 10% by weight of the halogen chain-stopped polysiloxane. The halogen chain-stopped polysiloxane is preferably in the form of a chlorinated polydimethylsiloxane.

Dihydric phenols that are included in Formula III are, for example,
2,2-bis(4-hydroxyphenyl)-propane
(bis-phenol-A); 2,4'-dihydroxydiphenylmethane;
bis-(2-hydroxyphenyl)-methane;
bis-(4-dihydroxyphenyl)-methane;
1,1-bis-(4-hydroxyphenyl)-ethane;
1,2-bis(4-hydroxyphenyl)-ethane;
1,1-bis(4-hydroxy-2-chlorophenyl)-ethane;
1,1-bis(2,5-dimethyl-4-hydroxyphenyl)-ethane;
1,3-bis-(3-methyl-4-hydroxyphenyl)- propane;
2,2-bis-(3-isopropyl-4-hydroxyphenyl)-propane and the like. Mixtures can also be used. Others will occur to those skilled in the art.

The copolymers described essentially comprise recurring units consisting of a polydiorganosiloxane interconnected by substituted aryloxy-silicon linkages to a polyester of carbonic acid precursor and a dihydric phenol.

Materials of the above nature are also described in U.S Pat. No. 3,189,662 and can be used either alone as such or in conjunction with well known modifiers to provide particular desired characteristics. U.S. Pat. No. 3,189,662 and the other patents to be discussed herewith are incorporated by reference.

Illustrative of the above block copolymers is General Electric LR-3320. This material has a specific gravity of 1.12, a tensile strength of 2500 to 3900 psi, an elongation of 230 to 430%, a tear strength (Die C) of 230–430 lbs./in., a brittleness temperature below −76° F. and a heat deflection temperature (10 mils under 66 psi load) of 160° F.

Another such block copolymer, specifically General Electric LR-5630, has a specific gravity of 1.07, a tensile strength of 2200 to 2500 psi, an elongation of 500 to 700%, a tear strength (Die C) of about 200 lbs./in., a brittleness temperature below −76° F. and a heat deflection temperature (66 psi) of 130° F.

The polyphenylene ether resin component is preferably a homo- or copolymer having units of the formula

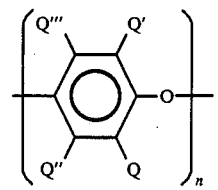

wherein Q, Q', Q'' and Q''' are independently selected from the group consisting of hydrogen, halogen, hydrocarbon radicals, halohydrocarbon radicals, hydocarbonoxy radicals, and halohydrocarbonoxy radicals; and n represents the total number of monomer units and is an integer at least about 20, and preferably at least 50.

In general, the polyphenylene ether resins are self-condensation products of monohydric monocyclic phenols produced by reacting the phenols with oxygen in the presence of complex metal catalysts, with molecular weight being controlled by reaction time, longer times providing a higher average number of repeating units. Particular procedures are known to those skilled in the art and are described in the patent literature, including U.S. Pat. Nos. 3,306,874 and 3,306,875 (to Allan Hay), and U.S. Pat. Nos. 3,257,357 and 3,257,358 (to Gelu Stamatoff).

Illustrative polymers which can be produced by such procedures and which are within the above general formula are:
poly(2,6-dilauryl-1,4-phenylene)ether;
poly(2,6-diphenyl-1,4-phenylene)ether;
poly(2,6-dimethoxy-1,4-phenylene)ether;
poly(2,6-diethoxy-1,4-phenylene)ether;
poly(2-methoxy-6-ethoxy-1,4-phenylene)ether;
poly(2-ethyl-6-stearyloxy-1,4-phenylene)ether;
poly(2,6-dichloro-1,4-phenylene)ether;
poly(2-methyl-6-phenyl-1,4-phenylene)ether;
poly(2,6-dibenzyl-1,4-phenylene)ether;
poly(2-ethoxy-1,4-phenylene)ether;
poly(2-chloro-1,4-phenylene)ether;
poly(2,6-dibromo-1,4-phenylene)ether; and the like.
Examples of other polyphenylene ethers corresponding to the above formula can be found in the above reference patents of of Hay and Stamatoff.

Also included are polyphenylene ether copolymers, such as copolymers of 2,6-dimethylphenol with other phenols, for example, with 2,3,6-trimethylphenol or 2-methyl-6-butylphenol, and the like. One preferred copolymer is poly(2,6-dimethyl-co-2,3,6-trimethyl-1,4-phenylene) ether.

For purposes of the present invention, an especially preferred family of polyphenylene ethers includes those having alkyl substitution in the two positions ortho to the oxygen ether atom, i.e., those of the above formula wherein Q and Q' are alkyl, most preferably having from 1 to 4 carbon atoms. Illustrative members of this class are:
poly(2,6-dimethyl-1,4-phenylene)ether;
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether;
poly(2-ethyl-6-propyl-1,4-phenylene)ether; and the like.
The most preferred polyphenylene ether resin for purposes of the present invention is poly(2,6-dimethyl-1, 4-phenylene)ether.

The polyphnylene ether resins useful in the compositions of this invention can be prepared by following known procedures, including those described by Allan Hay in U.S. Pat. Nos. 3,306.874, and 3,306,875 and by Gelu Stamatoff in U.S. Pat. Nos. 3,257,357 and 3,257,358.

The polyesters which may be employed as a component in the present compositions are in general relatively high in molecular weight, may be branched or linear, and are normally flammable thermoplastic polymers. Polyesters suitable for compositions of the present invention include, in general, linear saturated condensation products of diols and dicarboxylic acids, or reactive derivatives thereof. Preferably, they are polymeric glycol esters of terephthalic acid and isophthalic acid. These polymers are available commercially or can be prepared by known techniques, such as by the alcoholysis of esters of the phthalic acid with a glycol and subsequent polymerization, by heating glycols with the free acids or with halide derivatives thereof, and similar processes. Such polymers and methods of their preparation are described further by Whinfield et al., in U.S. Pat. No. 2,465,319 and by Pengilly in U.S. Pat. No. 3,047,539, and elsewhere.

Preferred polyesters are of the family consisting of, high molecular weight, polymeric glycol terephthalates or isophthalates having repeating units of the formula

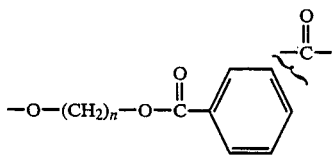

where n is a whole number from two to ten, and more usually from two to four, and mixtures of such esters, including copolyesters of terephthalic and isophthalic acids of up to 30 mol percent isophthalic units.

Especially preferred polyesters are poly(ethylene terephthalate) and poly(1,4-butylene terephthalate).

Especially favored when high melt strength is important are branched high melt viscosity poly(1,4-butylene terephthalate) resins which include small amounts, for example, up to 5 mol percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane, or dihydroxy carboxylic acids and hydroxydicarboxylic acids and derivatives, such as dimethyl hydroxyterephthalate, and the like.

The branched poly(1,4-butylene terephthalate) resins and their preparation are described in Borman U.S. Pat. No. 3,953,404.

Illustratively, the high molecular weight polyesters useful in the practice of this invention have an intrinsic viscosity of at least about 0.2 deciliters per gram, and more usually from about 0.4 to 1.5 deciliters per gram as measured in solution in ortho-chlorophenol or a 60/40 phenol/tetrachloroethane mixture at 25° to 30° C.

Also useful are copolyesters, such as segmented copolyesters having a multiplicity of recurring etherester and/or ester units as described by Witsiepe in U.S. Pat. Nos. 3,651,014; 3,763,109; and 3,766,146. Useful materials are available from E.I. duPont de Nemours and Co. under the trade designation "Hytrel" resins, for example Hytrel 4055 and Hytrel 5555.

The polyphenylene ether resin and the polyester resin components of the present invention are in general two thermodynamically immiscible polymers and small amounts of compatibilizers are usually employed in blends of such resins. Preferably, aromatic polycarbonates and rubber-modified impact modifiers are effective as compatibilizers to effect or improve compatibilization between the two resins.

Suitable aromatic polycarbonates can be prepared by polycondensation at the phase boundary, for example by the process described in German Pat. No. 1,300,266 or by transesterification of diphenyl carbonate with bisphenol-A by the process described in German Laid-Open Application DOS No. 1,495,730. Bisphenol-A may be replaced with as much as 30 mol % of other aromatic bishydroxy compounds, in particular 2,2-bis-(4-hydroxyphenyl)-pentane, 2,6-dihydroxy-naphthalene, bis-(4-hydroxyphenyl) sulfone, bis-(4-hydroxyphenyl) ether, bis-(4-hydroxyphenyl) sulfide, bis-(4-hydroxyphenyl)-methane, 1,1-bis-(4-hydroxyphenyl)-ethane or 4,4'-dihydroxydiphenyl.

Particularly suitable polycarbonates for the purpose according to the invention are those which have a relative viscosity (measured at 25° C. on a 0.5% strength by weight solution in methylene chloride) of from 1.2 to.1.5, preferably from 1.28 to 1.40.

The aromatic polycarbonate resins can be made in known ways and they are available commercially from sources, e.g., General Electric Company, Pittsfield, Mass., U.S.A., under the Trademark LEXAN.

The rubber modified impact modifiers which generally are blended intimately with the polyphenylene ether resin/polyester resin mixture to effect or improve compatibilization may be any of the elastomeric polymers and copolymers which are conventionally employed to improve impact properties in thermoplastic compositions. Illustratively, the impact modifiers can be selected from among elastomeric A-B-A[1] block copolymers wherein terminal blocks A and A[1] are the same or different and are in general derived from a vinyl aromatic compound, e.g., styrene, α-methyl styrene, vinyl toluene, vinyl xylene, vinyl naphthalene, and the like, and center block B is in general derived from a conjugated diene, e.g., butadiene, isoprene, 1,3-pentadiene, 2,3-dimethyl butadiene, and the like.

These can be made by an organometallic initiated polymerization process using for example, sodium or lithium metal or an organic deivative thereof. The diene monomers can be polymerized with a monofunctional or difunctional initiator, as is described in Kennedy et al., Interscience publishers, Vol. 23, Part II (1969), pages 553–559. Other methods of preparation are described in Zelinski, U.S. Pat. No. 3,251,905 and Holden et al., U.S. Pat. No. 3,231,635, the disclosures of which are incorporated herein by reference.

The relative ratios of the polymer units in the A-B-A[1] block copolymers can vary broadly. It is preferred that the center block B have a molecular weight greater than that of the combined terminal blocks. In general, the molecular weight of each of the respective terminal block will range from about 2,000 to about 100,000 and the molecular weight of the center block will range from about 65,000 to about 1,000,000.

Examples include the Kraton D resins, commercially available from Shell Chemical Co., Polymers Division, e.g., K-1101, K-1102 and K-1107.

Hydrogenated A-B-A¹ block copolymers can also be used and are also well known. In general, these are block copolymers of the A-B-A¹ type in which terminal blocks A and A¹ are the same or different and, prior to hydrogenation, comprise homopolymers or copolymers derived from vinyl aromatic hydrocarbons and, especially, vinyl aromatics wherein the aromatic moiety can be either monocyclic or polycyclic. Examples of the monomers are styrene, α-methyl styrene, vinyl xylene, ethyl vinyl xylene, vinyl naphthalene, and the like. Center block B will always be derived from a conjugated diene, e.g., butadiene, isoprene, 1,3-pentadiene, and the like. Preferably, center block B will be comprised of polybutadiene or polyisoprene.

The preparation of hydrogenated A-B-A¹ block copolymers is described in Jones, U.S. Pat. No. 3,431,323, the disclosure of which is incorporated herein by reference.

Examples include the Kraton G resins, commercially available from Shell Chemical Co., Polymers Division, e.g., G-1650, G-1651, and G-1652.

Also suitable are rubber-modified alkenyl aromatic resins, for example, rubber-modified high impact polystyrene. Examples of suitable alkenyl aromatic resins for compositions of the present invention are polystyrene, poly-p-methylstyrene, poly-α-methylstyrene, styrene-/α-methylstyrene, styrene/acrylonitrile, styrene/-methyl acrylate, styrene/butyl acrylate, styrene/methyl methacrylate, styrene/butadiene, styrene/maleic anhydride and styrene/acrylonitrile/butadiene copolymers, copolymers of ethylvinylbenzene and divinylbenzene, and styrene/butadiene polymers modified with acrylic resins. Mixtures of homopolystyrene and the above copolymers are also useful.

The rubber modifiers for the above alkenyl aromatic resins are elastomeric polymers. As a rule, such high impact styrene polymers contain from 2 to 20% by weight of an elastomeric polymer. Preferred elastomeric polymers have a glass transition temperature (Tg) of less than 0° C., in particular less than −20° C. Suitable elastomeric polymers are natural rubber, polybutadiene, polyisoprene, copolymers of butadiene and/or isoprene with styrene, a $C_2$–$C_8$-alkyl acrylate or acrylonitrile, polymers of $C_2$–$C_8$-alkyl acrylates, polyisobutylene and elastomeric copolymers composed of ethylene, propylene and dienes.

For the blends of the present invention, the proportions of the various components are not critical and can be blended in all proportions of (a) to (b). Preferably, the percentage of the silicone-polycarbonate block copolymer is from about 10 to 90% by weight of the blend, with percentages of 50% or more being most preferred for improved elastomeric and flame retardance properties. Where the silicone-polycarbonate block copolymer percentage is below 50%, the blends exhibit much improved impact strength and ductility.

In the preferred polyphenylene ether resin/polyester resin alloy, the polyphenylene ether resin can be present in a wide range of proportions, i.e., from 10–90% by weight, preferably 30–70% by weight and more preferably 40–60% of the two resins, with the polyester forming the balance of 100% by weight.

Also present in the preferred alloy are minor amounts of compatibilizers such as bisphenol—A polycarbonates and rubber - modified impact modifiers, which are present in an amount at least sufficient to effect or improve compatibility between the polyphenylene ether resin and the polyester resin. The compatibilizers may be used alone or in combination and are generally present in an amount of from 5–50% by weight, preferably less than about 30% by weight, more preferably less than about 25% by weight and most preferably less than about 10% by weight, relative to 100% by weight of the polyphenylene ether resin/polyester resin blend.

The present invention also contemplates the inclusion of additives to improve flame-retardance.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus, and nitrogen or combinations thereof. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition, but at least sufficient to render the compositions, where desired, non-burning or self-extinguishing. Those skilled in the art are well-aware that the amount will vary with the nature of the polymers in the blend and with the efficiency of the additive. In general, however, the amount of additive will be from 0.5 to 50 parts by weight per hundred parts of components (a) plus (b). A preferred range will be from about 3 to 25 parts and an especially preferred range will be from about 5 to 15 parts of additive per 100 parts of (a) plus (b). Smaller amounts of compounds highly concentrated in the elements responsible for flame-retardance will be sufficient, e.g., elemental red phosphorus will be preferred at 0.5 to 10 parts by weight per hundred parts of (a) plus (b), while phosphorus in the form of triphenyl phosphate will be used at 5 to 25 parts of phosphate per part of (a) plus (b), and so forth. Halogenated aromatics will be used at 2 to 20 parts and synergists, e.g., antimony oxide, will be used at about 1 to 10 parts by weight per 100 parts of components (a) plus (b).

Among the useful halogen-containing compounds are those of the formula

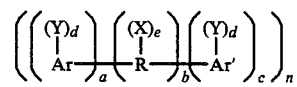

wherein n is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfur-containing linkage, e.g., sulfide, sulfoxide, sulfone, carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can also be a dihydric phenol, e.g., bisphenol-A carbonate linkage. Other groups which are represented by R will occur to those skilled in the art.

Ar and Ar' are mono- or polycarbocylic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula, are di-aromatics of which the following are representative:
2,2-bis-(3,5-dichlorophenyl)propane;
bis-(2-chlorophenyl)methane;
bis-(2,6-dibromophenyl)methane;
1,1-bis-(4-iodophenyl)ethane;
1,2-bis-(2,6-dichlorophenyl)ethane;
1,1-bis-(2-chloro-4-iodophenyl)ethane;
1,1-bis-(2-chloro-4-methylphenyl)ethane;
1,1-bis-(3,5-dichlorophenyl)ethane;
2,2-bis-(3-phenyl-4-bromophenyl)ethane;
2,3-bis-(4,6-dichloronaphthyl)propane;
2,2-bis-(2,6-dichlorophenyl)pentane;
2,2,-bis-(3,5-dichromophenyl)hexane;
bis-(4-chlorophenyl)phenylmethane;
bis-(3,5-dichlorophenyl)cyclohexylmethane;
bis-(3-nitro-4-bromophenyl)methane;
bis-(4-hydroxy-2,6-dichloro-3-methoxyphenyl)methane;
2,2-bis-(3,5-dichloro-4-hydroxyphenyl)propane; and
2,2-bis-(3-bromo-4-hydroxyphenyl)propane.

The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkylene group and having at least two chlorine or bromine atoms per phenyl nucleus, and mixtures of at least two of the foregoing.

Especially preferred are hexabromobenzene and chlorinated biphenyls or terphenyls, alone, or mixed with antimony oxide.

In general, the preferred phosphate compounds are selected from elemental phosphorus or organic phosphonic acids, phosphonates, phosphinates, phosphonites, phosphinites, phosphene oxides, phosphenes, phosphites or phosphates. Illustrative is triphenyl phosphene oxide. These can be used alone or mixed with hexabromobenzene or a chlorinated biphenyl and, optionally, antimony oxide.

Typical of the preferred phosphorus compounds to be employed in this invention would be those having the general formula

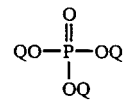

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenyl-bis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)-phenyl phosphate, tri(nonylphenyl)phosphate, phenylmethyl hydrogen phosphate, triphenyl phosphate, halogenated triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(axiridinyl)-phosphine oxide or tetrakis(hydroxymethyl)phosphonium chloride. These flame-retardant additives are commercially available.

In addition, the compositions of this invention may include other optional constituents such as minor amounts of polyethylene, tridecylphosphite, mineral reinforcing agents such as zinc oxide, zinc sulfide and various types of fillers such as clays and the like.

The novel materials may also contain, as a further component, effective amounts of any additives and/or assistants as conventionally used for thermoplastic polymers for molding materials. Examples of such additives and/or assistants are plasticizers, dyes, pigments, antistatic agents, antioxidants, lubricants and mold release agents.

The following examples illustrate the invention. They are set forth as a further description, but are not to be construed as limiting the invention thereto.

DESCRIPTION OF THE PREFERRED EMBODIMENTS

Silicone-polycarbonate block copolymer, Copel ® 3320 (a registered trademark of the General Electric Company), is blended with each of two polyphenylene ether ("PPE")/poly(1,4-butylene terephthalate) ("PBT") alloys (1 and 2, Table I) to form the following Copel ®: PPE/PBT alloy (an alloy of Copel ®, PPE and PBT) ratios: 10/90, 20/80, 30/70, 50/50, 70/30, 80/20, and 90/10. The materials were compounded in a Werner-Pfleiderer K-28 twin screw extruder after tumble mixing in a plastic bag. The screw RPM's were maintained at 280-290, and the melt temperature varied from about 600° to 625° F.

TABLE I

| PPE/PBT/POLYCARBONATE ALLOY FORMULATIONS | | |
|---|---|---|
| | No. 1 | No. 2 |
| Poly(2,6 dimethyl-1,4-phenylene)ether | 30 | 30 |
| Rubber Modified polystyrene | — | 5 |
| Impact Modifier (S-EB-S) | 8 | 8 |
| Poly(bisphenol-A carbonate) 0.6 I.V. | — | 8 |
| Poly(bisphenol-A carbonate) 1.3 I.V. | 8 | — |
| Poly(1,4-butylene terephthalate) | 45 | 45 |
| Stabilizers and antioxidants | 1.5 | 1.5 |

The pelletized extrudes were dried at about 100° C. for 1-3 hours prior to injection molding into test specimens with a 4 oz. Newbury machine. The barrel temperature was maintained at 500° F. Mold temperatures varied between 150°-170° F.

The properties listed in Tables II and III for alloys of Copel ® and PPE/PBT alloys Nos. 1 and 2, respectively, indicate that compositions containing 50% or more Copel ® resin exhibit elastomeric properties. The rheological characteristics of these materials show surprisingly little dependence upon composition and self-extinguishing flame resistance (V-0 or V-1) is retained.

For those compositions containing less than 50% Copel ® resin, much improved impact strength and ductility are achieved with the PPE/PBT No. 2 formulation which contains 5 pbw rubber modified polystyrene.

TABLE II

| PROPERTIES OF COPEL ® 3320 BLENDS WITH PPE/PBT ALLOYS | | | | | | | | |
|---|---|---|---|---|---|---|---|---|
| SAMPLE NUMBER | 1 | 2 | 3 | 4 | 5 | 6 | 7 | A |
| COMPOSITION | | | | | | | | |
| COPEL ® 3320 | 90 | 80 | 70 | 50 | 30 | 20 | 10 | 0 |
| PPE/PBT No. 1 | 10 | 20 | 30 | 50 | 70 | 80 | 90 | 100 |
| PROPERTIES: | | | | | | | | |
| NOTCHED IZOD IMPACT (FT LBS/IN NOTCH) | NB* | NB | NB | 5.2 | 0.6 | 0.2 | 0.1 | 14.8 |
| DYNATUP FRACTURE ENERGY (FT LBS) | | | | | | | | |
| 73° F. | 31.0 | 30.7 | 30.5 | 29.5 | 18.4 | 8.2 | 1.8 | 36 |
| −40° F. | 33.2 | 34.3 | 34.1 | 28.7 | 1.6 | 1.0 | 0.7 | 25 |
| VICAT SOFTENING TEMP (°F.) | 151 | 149 | 157 | 171 | 314 | 360 | 376 | — |
| HDT @ 264 PSI (°F.) | — | — | — | — | — | 127 | 139 | — |
| TENSILE STRENGTH (PSI) YIELD | 1400 | 1560 | 1880 | 2240 | 3120 | 3360 | 3650 | 6040 |
| ULTIMATE | 2710 | 2970 | 2930 | 2480 | 3120 | 3360 | 3650 | 5000 |
| % ELONGATION | 189 | 167 | 129 | 43 | 8 | 3 | 3 | 50 |
| FLEXURAL MODULUS (× $10^3$ PSI) | — | — | — | — | — | 146 | 192 | 250 |
| FLEXURAL STRENGTH (PSI) | — | — | — | — | — | 4690 | 5170 | 9160 |
| FLOW CHANNEL (IN) | 20.0 | 19.8 | 19.0 | 21.0 | 22.8 | 22.0 | 20.0 | — |
| MELT VISCOSITY (POISE) @ 260 C AND 1500 SEC-1 | 2770 | 2110 | 2240 | 2060 | 2130 | 2440 | 2780 | — |
| UL 94 FLAMMABILITY RATING | V-0 | V-0 | V-1 | V-1 | BURNED | BURNED | BURNED | — |
| AVG BURN TIME (SEC) | 2.9 | 3.7 | 7.0 | 5.8 | — | — | — | — |

*"NB" indicates "no break".

TABLE III

| PROPERTIES OF COPEL ® 3320 BLENDS WITH PPE/PBT ALLOYS | | | | | | | | |
|---|---|---|---|---|---|---|---|---|
| SAMPLE NUMBER | 8 | 9 | 10 | 11 | 12 | 13 | 14 | B |
| COMPOSITION | | | | | | | | |
| COPEL ® 3320 | 90 | 80 | 70 | 50 | 30 | 20 | 10 | 0 |
| PPE/PBT No. 2 | 10 | 20 | 30 | 50 | 70 | 80 | 90 | 100 |
| PROPERTIES: | | | | | | | | |
| NOTCHED IZOD IMPACT (FT LBS/IN NOTCH) | NB* | NB | NB | 13.9 | 2.8 | 1.5 | 0.8 | 15.3 |
| DYNATUP FRACTURE ENERGY (FT LBS) | | | | | | | | |
| 73° F. | 30.1 | 29.8 | 30.3 | 30.7 | 30.4 | 27.3 | 22.6 | — |
| −40° F. | 34.9 | 36.4 | 35.7 | 37.6 | 15.4 | 8.5 | 3.8 | — |

TABLE III-continued

| PROPERTIES OF COPEL ® 3320 BLENDS WITH PPE/PBT ALLOYS | | | | | | | | |
|---|---|---|---|---|---|---|---|---|
| SAMPLE NUMBER | 8 | 9 | 10 | 11 | 12 | 13 | 14 | B |
| VICAT SOFTENING TEMP (°F.) | 150 | 154 | — | — | — | — | — | — |
| HDT @ 264 PSI (°F.) | — | — | 92 | 105 | 119 | 127 | 142 | — |
| TENSILE STRENGTH (PSI) YIELD | 1330 | 1490 | 1930 | 2720 | 3480 | 3990 | 4640 | 6410 |
| ULTIMATE | 2840 | 3100 | 3280 | 2720 | 3480 | 3990 | 4640 | 5270 |
| % ELONGATION | 175 | 165 | 150 | 76 | 20 | 10 | 9 | 34 |
| FLEXURAL MODULUS (× $10^3$ PSI) | — | — | 48 | 84 | 131 | 163 | 198 | 255 |
| FLEXURAL STRENGTH (PSI) | — | — | 1400 | 2530 | 4330 | 5430 | 6680 | 9230 |
| FLOW CHANNEL (IN) | 17.8 | 17.8 | 20.3 | 19.3 | 19.5 | 19.3 | 19.0 | — |
| MELT VISCOSITY (POISE) @ 260 C AND 1500 SEC-1 | 2590 | 2620 | 2590 | 2910 | 3200 | 3130 | 3230 | — |
| UL 94 FLAMMABILITY RATING | V-0 | V-0 | V-0 | V-1 | BURNED | BURNED | BURNED | — |
| AVG BURN TIME (SEC) | 1.3 | 3.3 | 5.0 | 7.9 | — | — | — | — |

*"NB" indicates "no break".

All of the patents and/or publications mentioned above are incorporated herein by reference. Other modifications and variations of the invention are possible in light of the above disclosure. For instance, instead of poly(1,4-butylene terephthalate) or poly(ethylene terephthalate) individually, mixtures of these two can be employed. Copolyesters can also be substituted for the homopolymeric polyesters shown.

It is claimed:

1. A thermoplastic composition comprising: (a) silicone-polycarbonate copolymer; and (b) an admixture comprised of polyphenylene ether resin, polyester resin and aromatic polycarbonate resin.

2. A thermoplastic composition comprising: (a) silicone-polycarbonate block copolymer; (b) compatibilized polyphenylene ether resin and polyester resin blend comprising
   (i) polyphenylene ether resin;
   (ii) polyester resin; and
   (iii) at least one compatibilizer in an amount sufficient to effect or improve compatibility between components (b)(i) and (b)(ii).

3. The composition according to claim 2 wherein said silicone-polycarbonate block copolymer is of the formula:

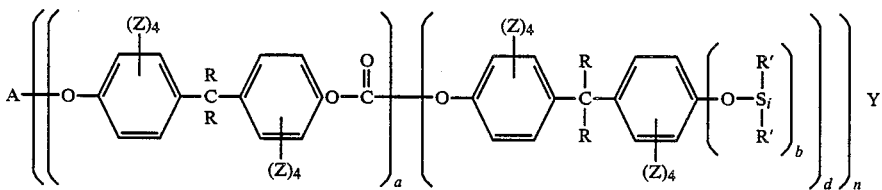

wherein n is an integer equal to from 1 to about 1000, inclusive; a is equal to from 1 to about 200, inclusive; and b is from about 1 to 100 inclusive; the ratio of a to b can vary from about 0.05 to about 3, inclusive; d is 1 or more; Y is

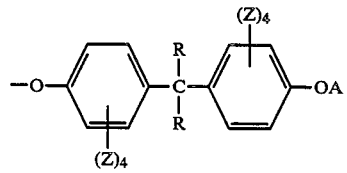

A is a member selected from the group consisting of hydrogen and $$-\overset{O}{\underset{\|}{C}}-OR''$$

R is a member selected from the group consisting of hydrogen, monovalent hydrocarbon radicals and halogenated monovalent radicals, R' is a member selected from the group consisting of monovalent hydrocarbon radicals and cyanoalkyl radicals, R" is a member selected from the group consisting of monovalent hydrocarbon radicals and halogenated hydrocarbon radicals, and Z is a member selected from the group consisting of hydrogen, lower alkyl radicals and halogen radicals and mixtures thereof.

4. The composition according to claim 2 wherein said polyphenylene ether is poly(2,6-dimethyl - 1, 4-phenylene oxide).

5. The composition according to claim 2 wherein said polyphenylene ether is poly(2,6 dimethyl-co-2,3,6 trimethyl-1,4-phenylene)ether.

6. The composition according to claim 2 wherein said polyester is poly(1, 4-butylene terephthalate).

7. The composition according to claim 2 wherein said polyester is poly(ethylene terephthalate).

8. The composition according to claim 2 wherein said compatibilizer is an aromatic polycarbonate.

9. The composition according to claim 8 wherein said aromatic polycarbonate is bisphenol-A polycarbonate.

10. The composition according to claim 2 wherein said compatibilizer comprises rubber-modified polystyrene.

11. The composition according to claim 2 wherein said compatibilizer comprises bisphenol-A polycarbonate and rubber-modified polystyrene.

12. The composition according to claim 2 wherein said compatibilized blend contains at least 70% by weight in combination, of said polyester resin and polyphenylene ether resin, based on 100% by weight of (b)(i), (b)(ii) and (b)(iii).

13. The composition according to claim 2 wherein said compatibilized blend contain about 34% by weight of said polyphenylene ether, about 49% by weight of said polyester, and about 17% by weight of said compatibilizer based on 100% by weight of (b)(i), (b)(ii) and (b)(iii).

14. The composition according to claim 2 containing 50% or more by weight of said silicone-polycarbonate copolymer.

15. The composition according to claim 2 wherein said compatibilizer comprises about 5% by weight of rubber-modified polystyrene and about 8% by weight of bisphenol-A polycarbonate based on 100% by weight of (b)(i), (b)(ii) and (b)(iii).

16. The composition according to claim 2 wherein the composition contains 50% or more of said compatibilized blend alloy.

17. The composition according to claim 16 further comprising a flame-retardant agent.

18. The composition according to claim 17 wherein said flame-retardant agent is a halogenated bisphenol-A polycarbonate.

19. A thermoplastic composition comprising:
(a) from about 10% to 90% by weight of silicone-polycarbonate copolymer; and
(b) from about 90% to about 10% of an admixture comprised of polyphenylene ether resin, polyester resin and aromatic polycarbonate resin.

* * * * *